United States Patent [19]
Sheldon

[11] 3,989,579
[45] Nov. 2, 1976

[54] APPARATUS FOR FORMING ENVELOPES

[75] Inventor: Gary L. Sheldon, Pullman, Wash.

[73] Assignee: Evans Products Company, Portland, Oreg.

[22] Filed: Feb. 27, 1975

[21] Appl. No.: 553,802

[52] U.S. Cl. .............................. 156/443; 29/204 R; 156/499; 156/568
[51] Int. Cl.² ........................................... B65C 9/00
[58] Field of Search ............ 156/216, 213, 226–227, 156/443, 468, 475–479, 486–492, 566, 567–568, 571, 521; 53/234, 209, 225; 93/11, 12, 39.3; 29/204; 136/147, 148, 175, 176; 220/69, 61 R

[56] References Cited
UNITED STATES PATENTS

| | | | |
|---|---|---|---|
| 911,070 | 2/1909 | Ranz | 156/568 |
| 2,064,658 | 12/1936 | Grieb et al. | 156/486 |
| 2,373,082 | 4/1945 | Staelin | 29/204 X |
| 2,624,106 | 1/1953 | Lund | 29/204 |
| 2,853,839 | 9/1958 | Hermann | 53/234 X |
| 2,998,052 | 8/1961 | Roeber | 156/568 X |
| 3,011,935 | 11/1961 | Bodek et al. | 53/209 UX |
| 3,816,219 | 6/1974 | Hurlbut et al. | 156/521 |
| 3,892,620 | 7/1975 | Heussy | 156/443 |

Primary Examiner—David A. Simmons
Attorney, Agent, or Firm—Robert E. Howard

[57] ABSTRACT

An apparatus for forming envelopes from thermoplastic sheet material including means for feeding said sheets at predetermined intervals along a conveyor means, means for heating the thermoplastic sheet along a narrow transverse zone, means for moving the heated sheet into contact with a curved surface which is of such a configuration that the sheet is folded along the heated zone into an envelope, and means for heat sealing the envelope along the side edges thereof.

4 Claims, 34 Drawing Figures

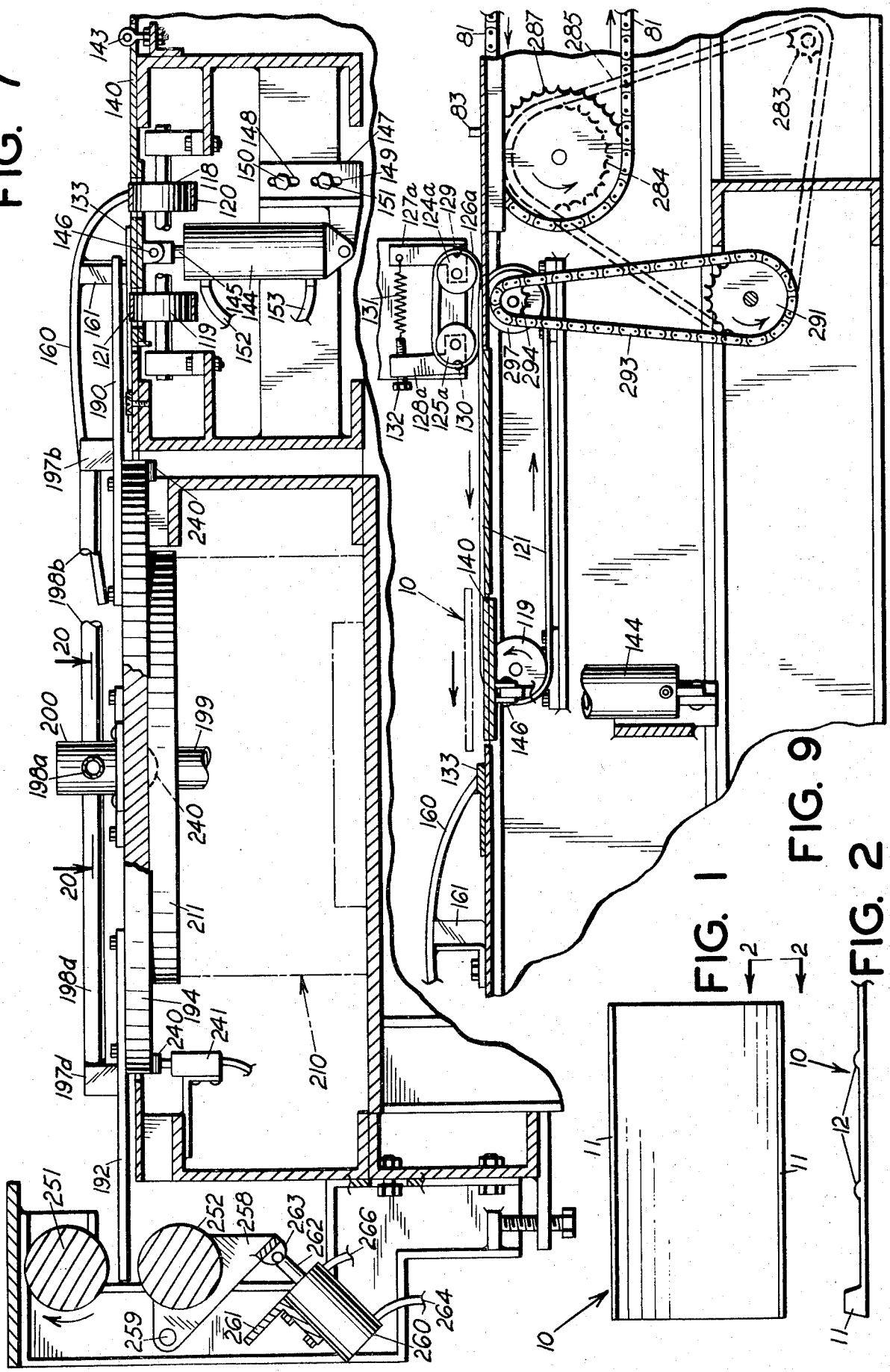

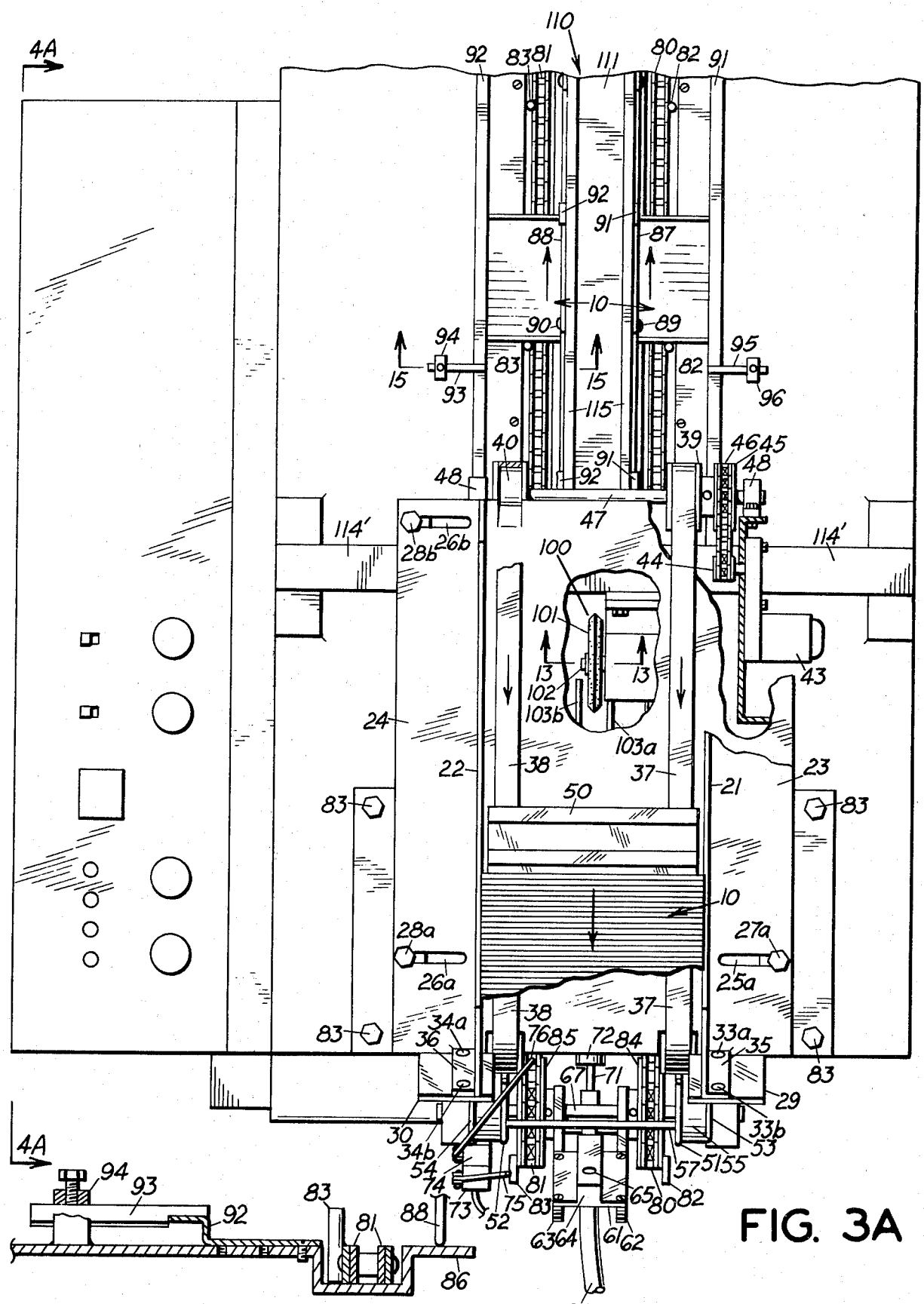

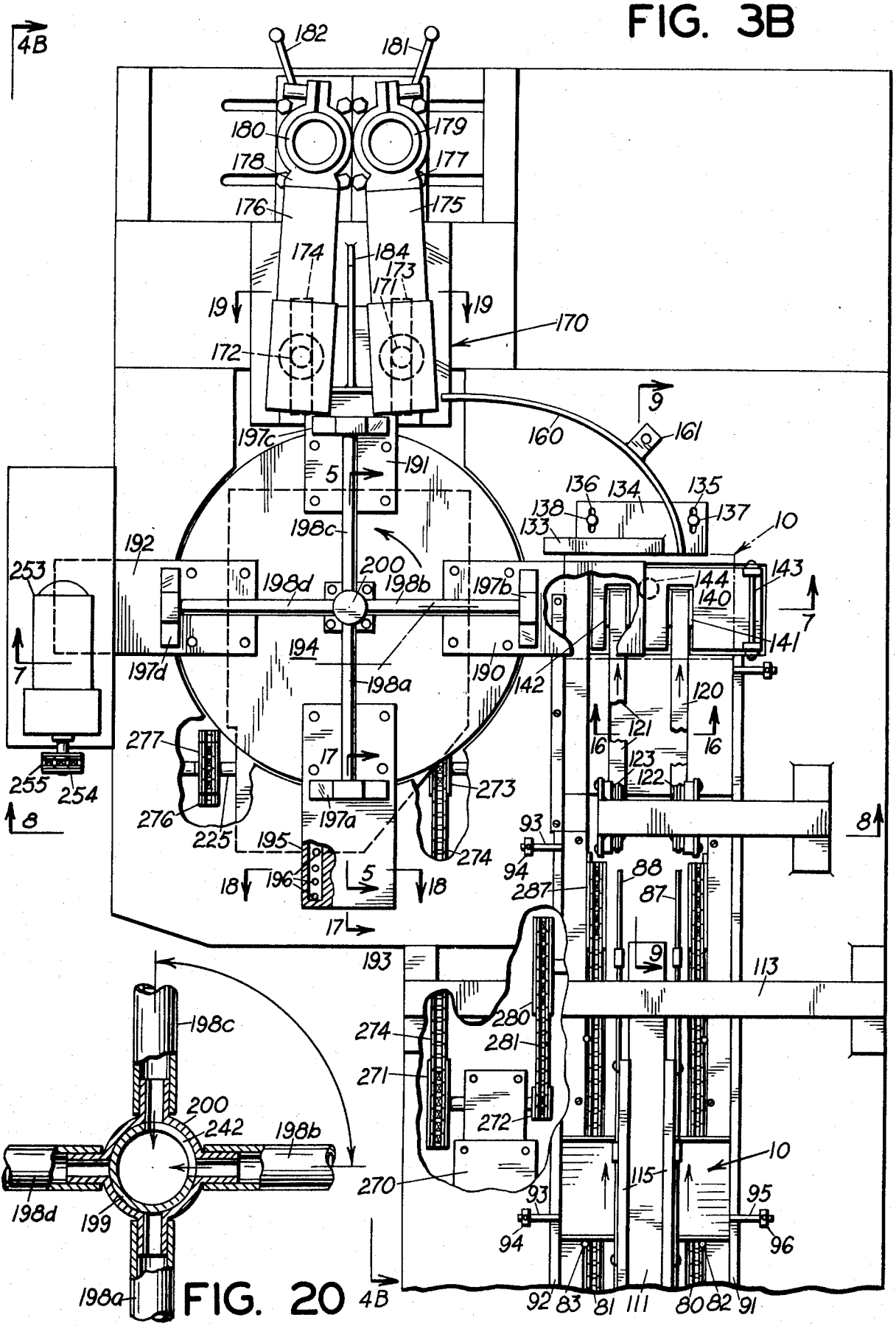

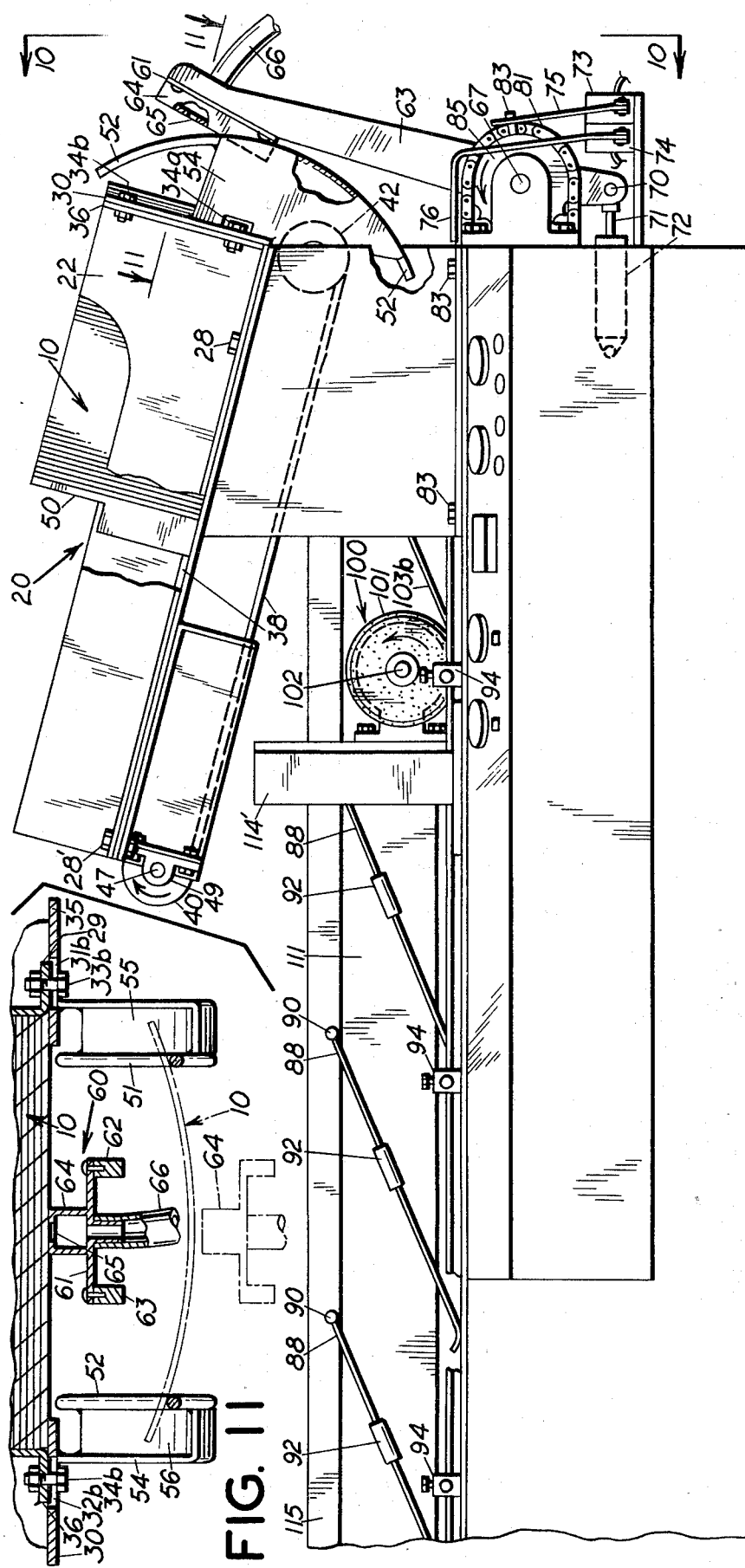

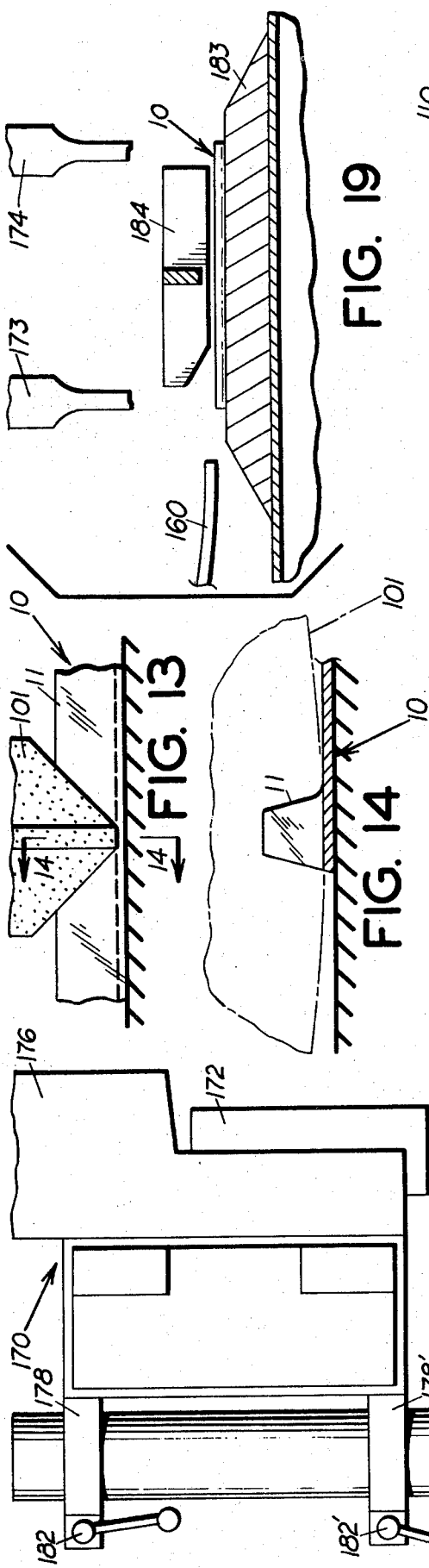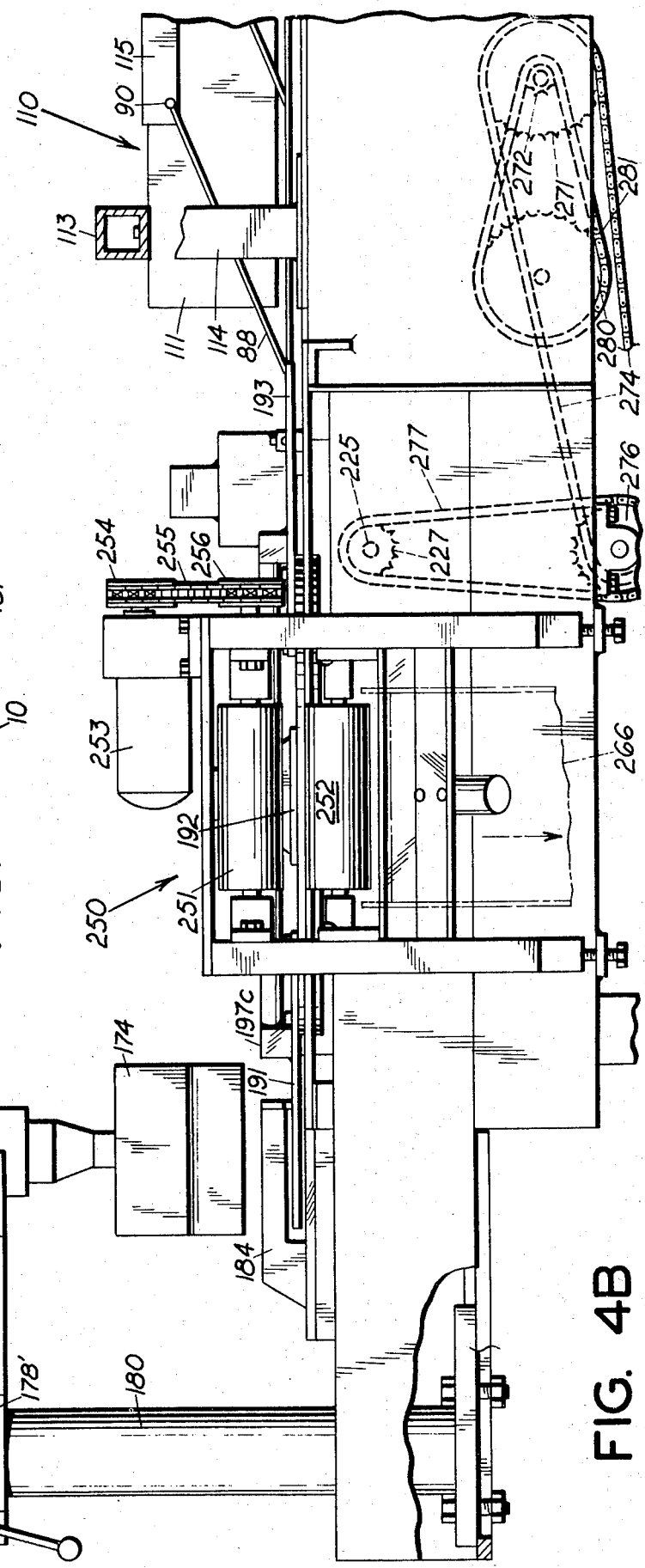

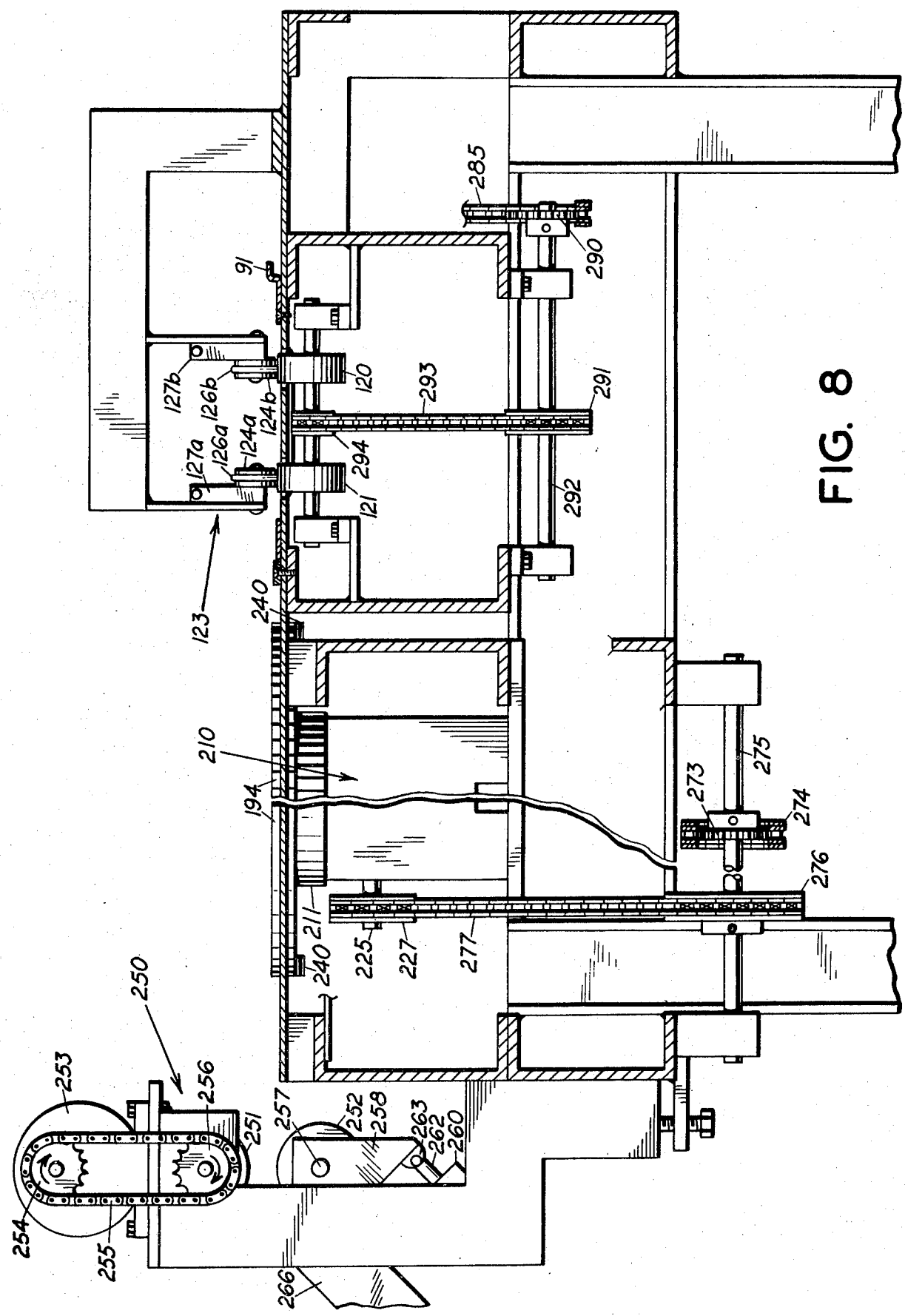

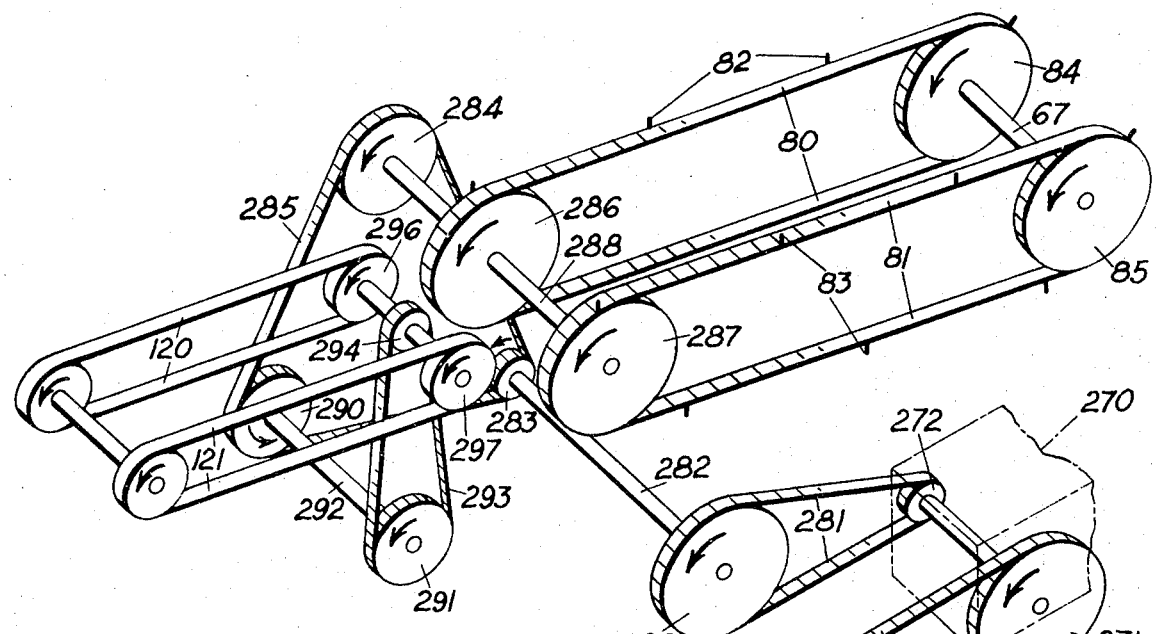
FIG. 12
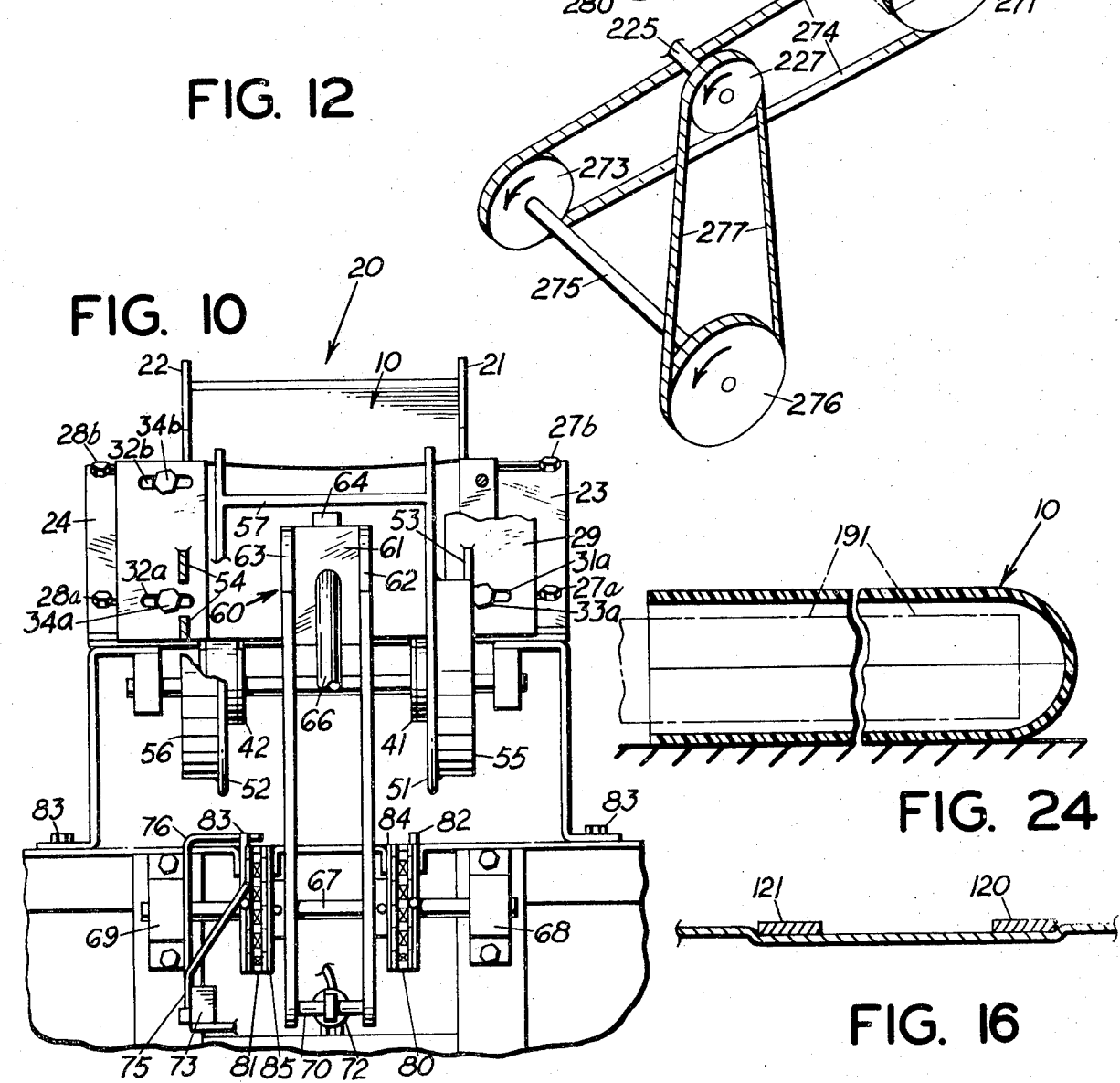
FIG. 10
FIG. 24
FIG. 16

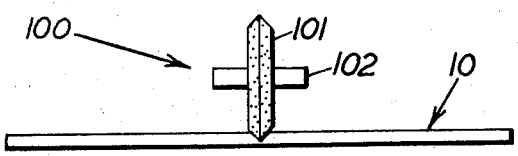
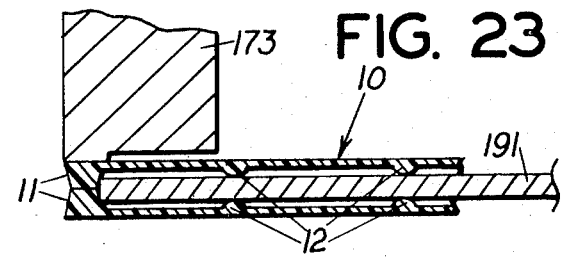
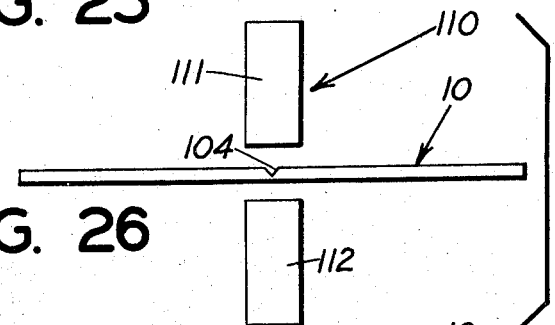
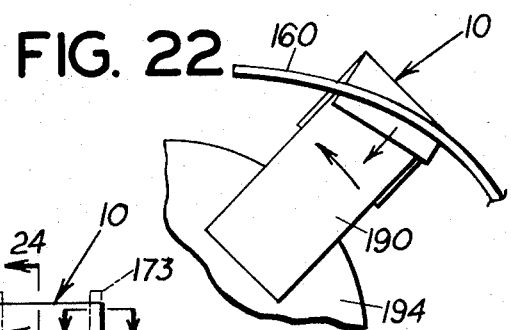
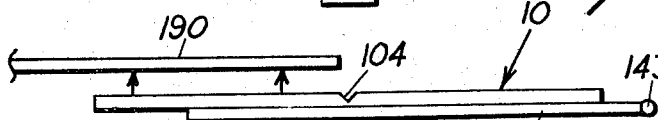
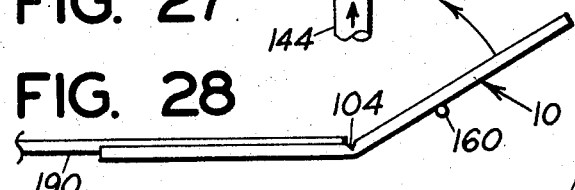
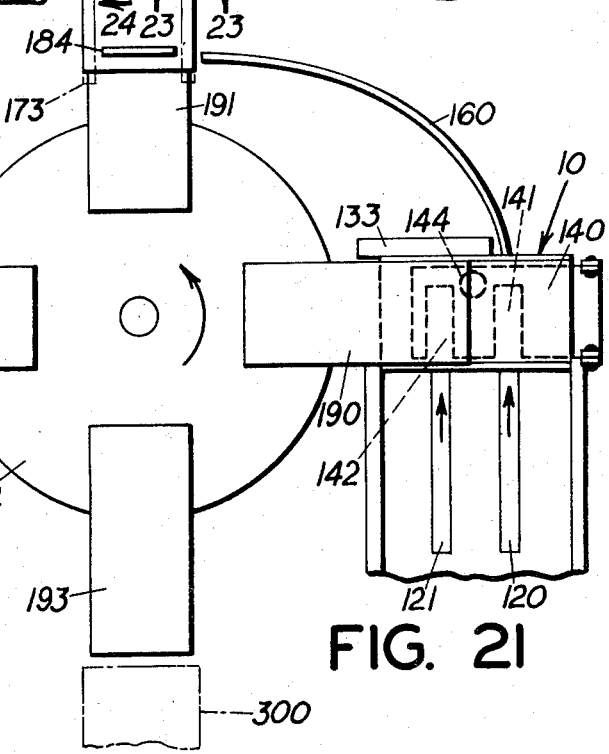
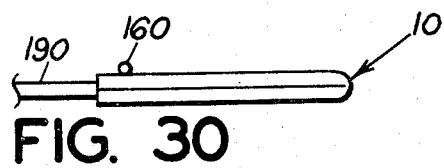
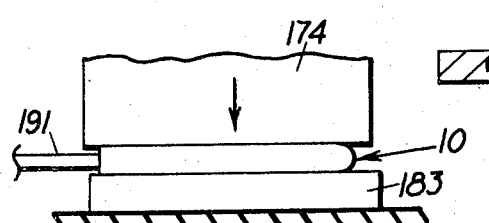
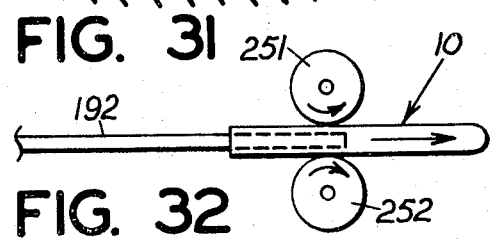
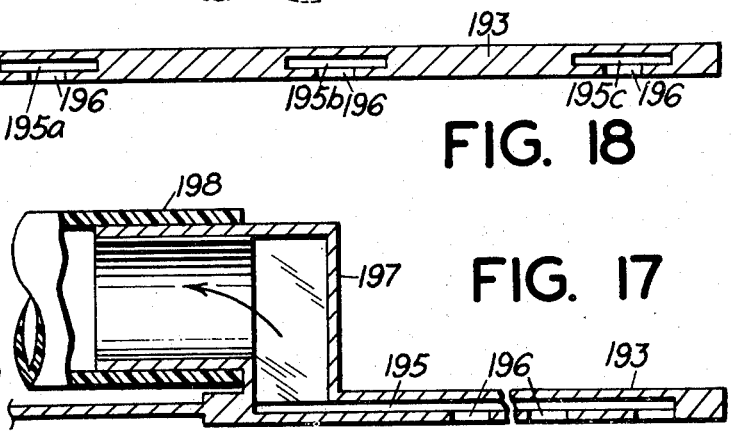
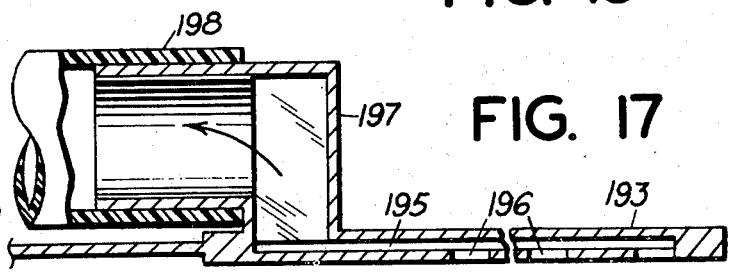

APPARATUS FOR FORMING ENVELOPES

BACKGROUND OF THE INVENTION

Battery separators are commonly employed as a permeable insulating diaphragm interposed between plates of opposite polarity in a battery so that the electrolyte forms the sole connecting path therebetween. The typical separator in a porous diaphragm with parallel longitudinal ribs on one surface thereof. The ribs are normally adjacent the positive plate and the flat side of the diaphragm is adjacent the negative plate.

One type of separator is the so-called "sintered PVC" separator formed by sintering granular polyvinyl chloride upon a moving belt, the rib pattern being formed prior to sintering by suitable die means. One method of making such a separator is described in U.S. Pat. No. 3,450,571.

A method and apparatus have recently been disclosed in copending application Ser. No. 431,146 filed Jan. 7, 1974, now U.S. Pat. No. 3,892,620, for forming envelopes of thermoplastic sheet material such as a battery separator blank made from sintered polyvinyl chloride. In the device disclosed in said copending patent application, the battery separator blanks are fed along a conveying means past a heating station where the blank is heated along a narrow transverse zone, and into a folding and sealing station where the blank is folded into an envelope and heat sealed. While this device is satisfactory, a less complicated and easier to maintain device has been invented which is the subject matter of the present patent application.

SUMMARY OF THE INVENTION

It is an object of the present invention to provide an apparatus for forming envelopes of thermoplastic sheet material which is simple in operation and easy to maintain.

The invention comprises means to feed sheets of thermoplastic sheet material, such as battery separator blanks formed of sintered or extruded polyvinyl chloride, polyethylene, polypropylene, etc. at regular intervals to a conveying means; means located along the conveyor to heat the sheets in a narrow transverse zone along the path where the sheet is to be folded; means for folding the sheet along the heated zone by moving the sheet into contact with a curved surface whose configuration is such that the sheet is folded into an envelope; heat sealing means for sealing the envelope along the side edges thereof; and off-feeding means for removing the completed envelope from the machine.

DESCRIPTION OF THE DRAWINGS

FIG. 1 is a top view of a battery separator blank;

FIG. 2 is a partial cross section view of a battery separator blank taken along lines 2—2 of FIG. 1;

FIG. 3A is a top plan elevation view of the loading, grinding, and heating stations;

FIG. 3B is a top plan elevation view of the folding, sealing, and off-feeding stations;

FIG. 4A is a side plan view of the loading, grinding, and heating stations taken along lines 4A—4A of FIG. 3A;

FIG. 4B is a side plan view of the folding, sealing, and off-feeding stations taken along lines 4B—4B of FIG. 3B;

FIG. 7 is a partial cross section view of the folding mechanism, turntable, and off-feed units taken along lines 7—7 of FIG. 3B;

FIG. 8 is a partial cross section view of the apparatus of the present invention taken along lines 8—8 of FIG. 3B;

FIG. 9 is a partial cross section view of the speedup conveyor system and the initial portion of the folding zone taken along lines 9—9 of FIG. 3B;

FIG. 10 is an end view of the loading station taken along lines 10—10 of FIG. 4A;

FIG. 11 is a partial cross section top view of the loading mechanism taken along lines 11—11 of FIG. 4A;

FIG. 12 is a diagramatic perspective view of the drive mechanism;

FIG. 13 is a fragmentary front section view of the grinding wheel taken along lines 13—13 of FIG. 3A;

FIG. 14 is a fragmentary side section view of the grinding wheel taken along lines 14—14 of FIG. 13;

FIG. 15 is a partial cross section view of a portion of the chain conveying mechanism and adjustable guide wall taken along lines 15—15 of FIG. 3A;

FIG. 16 is a view of the deck and speedup belts taken along lines 16—16 of FIG. 3B;

FIG. 17 is a partial cross sectional view of a pickup arm taken along lines 17—17 of FIG. 3B;

FIG. 18 is a cross sectional view of a pickup arm taken along lines 18—18 of FIG. 3B;

FIG. 19 is a fragmentary plan view of the heat sealing station taken along lines 19—19 of FIG. 3B;

FIG. 20 is a fragmentary cross section of the turntable manifold and nipple taken along lines 20-20 of FIG. 7;

FIG. 21 is a diagramatic top view of the folding, sealing, and off-feeding stations;

FIG. 22 is a partial diagramatic view of a separator blank being carried by the pickup arm in a partially folded position;

FIG. 23 is a partial section view of a folded separator in the heat sealing station taken along lines 23—23 of FIG. 21;

FIG. 24 is a partial section view of a folded separator envelope carried by a pickup arm in position to be heat sealed taken along lines 24—24 of FIG. 21;

FIG. 25 is a diagramatic front view of the grinding wheel acting upon a battery separator blank;

FIG. 26 is a diagramatic front view of the heating mechanism acting upon a battery separator blank;

FIGS. 27–30 are a series of diagramatic side views showing the separator blank being folded;

FIG. 31 is a diagramatic side view of the folded separator blank envelope being heat sealed; and FIG. 32 is a diagramatic side view of the folded, sealed separator envelope being off-fed from the pickup arm.

DESCRIPTION OF PREFERRED EMBODIMENTS

Figure 5:
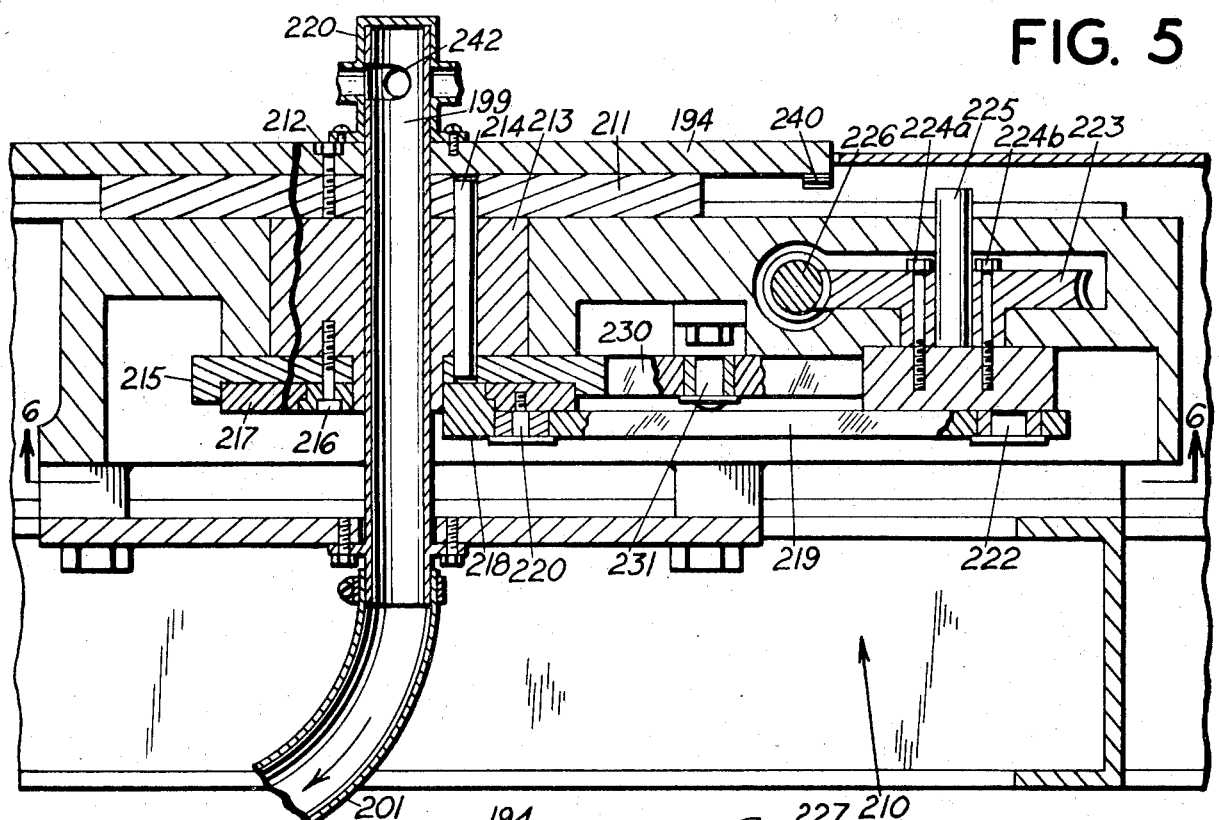
FIG. 5 is a cross sectional side view of the indexing mechanism taken along line 5—5 of FIG. 3B.

The present invention will be discussed relative to forming envelopes from battery separator blanks. However, it is to be understood that the method and apparatus of the present invention would be equally applicable to any sheet of thermoplastic material from which it is desired to form envelopes.

In FIG. 1 there is illustrated a battery separator blank 10 having longitudinal edge ribs 11 and inner longitudinal ribs 12. As shown in FIG. 2, the ribs are formed along one surface while the other surface of the battery separator blank is smooth.

In FIGS. 3A and 4A there is illustrated a hopper 20 for holding a plurality of battery separator blanks 10. The hopper has two side walls 21 and 22. Hopper side walls 21 and 22 are welded to horizontal leg members 23 and 24, respectively. Horizontal leg members 23 and 24 both have a pair of slots 25a and 25b and 26a and 26b located therein, only 25a being illustrated in FIG. 3A in view of the cutaway portion of the drawing. Suitable fastening members 27a and 27b and 28a and 28b pass through slots 25 and 26, respectively, and thereby adjustably secure the horizontal leg members 23 and 24 and their associated side walls 21 and 22 to the machine frame, whereby side walls 21 and 22 may be adjusted inwardly and outwardly to thereby accommodate separator blanks of varying width.

Located in the rear portion of hopper 20 are a pair of end walls 29 and 30, as best illustrated in FIGS. 3A, 10, 11. End walls 29 and 30 are adjustable inwardly and outwardly by virtue of slots 31a and 31b and 32a and 32b located therein, respectively, and fastening members 33a and 33b and 34a and 34b passing therethrough and into flanges 35 and 36 located along the rear portions of side walls 21 and 22, respectively.

The bottom of hopper 20 is comprised of a pair of belts 37 and 38 which are trained around powered pulleys 39 and 40, respectively, at the forward end thereof and around freewheeling pulleys 41 and 42 at the rearward ends thereof, respectively. Powered pulleys 39 and 40 are driven by a motor and gearbox 43 acting via sprocket wheels 44 and 45 and sprocket chain 46 trained thereabout. Sprocket wheel 45 drives a shaft 47 to which are fastened powered pulleys 39 and 40. The outer ends of shaft 47 are carried in suitable journal bearings 48 and 49 attached to the machine frame. The action of pulleys 37 and 38 is to urge separator blanks 10 against end walls 29 and 30.

A weight 50 of suitable shape is located at the forward end of the plurality of separator blanks 10 to hold them in a vertical position within the hopper 20.

Located at the rearward portion of hopper 20 is a pair of curved tracks 51 and 52. Curved tracks 51 and 52 are held on the machine frame by virtue of being attached to track side walls 53 and 54, via associated flanges 55 and 56 extending from said side walls 53 and 54, respectively. A horizontal stop member 57 extends between curved tracks 51 and 52.

Located behind hopper 20 is a battery separator feeding device 60, which is illustrated in FIGS. 3A, 4A, 10 and 11. Feeding device 60 is comprised of a suction head 61 carried by a pair of arms 62 and 63. Suction head 61 has a raised land portion 64 in which is located a suction opening 65. Suction opening 65 communicates with a suitable source of vacuum (not shown) by means of vacuum hose 66. The lower portion of arms 62 and 63 pivot about a fixed shaft 67 which is fastened to the machine frame by suitable fastening members 68 and 69. A cross member 70 extends between the bottoms of shaft arms 62 and 63, and is connected to the piston rod 71 of an air cylinder 72, as shown. Air cylinder 72 is connected to a suitable source of air under pressure by a pair of hoses (not illustrated) in a well known manner such that piston rod 71 may be extended and retracted.

A pair of switches 73 and 74 located on the machine frame are actuated by switch arms 75 and 76, respectively. Switch 73, when actuated, operates suitable valve means associated with the air supply (not shown) to extend piston rod 71 and thereby move suction head 61 inwardly to the position best illustrated in FIG. 11. In this position the suction head 61 is in contact with the leading battery separator blank 10, as shown in FIG. 11. Upon actuation of switch 74, piston rod 71 is retracted, which causes arms 62 and 63 to withdraw suction head 61 to the position illustrated in FIGS. 4A and 11. A single battery separator blank 10 carried by the action of the suction of suction head 61 then comes into contact with curved rails 51 and 52 as well as horizontal stop member 57, whereupon the suction is broken and the battery separator blank slides down curved tracks 51 and 52 by the action of gravity. The method of actuation of switches 73 and 74 will be explained below.

Curved tracks 51 and 52 are configured so that a battery separator blank 10 sliding down the tracks by virtue of the action of gravity is accurately positioned on conveyor chains 80 and 81. Chains 80 and 81 carry a plurality of positioning pegs 82 and 83, respectively. Pegs 82 and 83 serve to carry the separator blanks 10 and accurately position them for subsequent treatment, as best illustrated in FIG. 3A.

The manner in which switches 73 and 74 are actuated will now be explained. As shown in FIG. 4A, when conveyor chain 81 passes around sprocket wheel 85, positioning pegs 83 first contact switch arm 75 which actuates switch 73, effecting extension of piston rod 71 via suitable valve means, suction head 61 moves forward into contact with the leading battery separator blank 10 carried by hopper 20. As the same positioning peg 83 moves on around and contacts switch arm 76, switch 74 is actuated, and the air cylinder 72 is actuated via suitable valve means to retract piston rod 71 and suction head 61 along with the battery separator blank 10 carried thereby.

As the battery separator blanks 10 are carried by conveyor chains 80 and 81, they are held down in a position flush with the upper deck 86 of the machine by a plurality of hold down fingers 87 and 88 located along both sides of the machine as illustrated in FIGS. 3A and 4A. As shown in FIG. 4A, hold down fingers 88 are pivotally attached to the machine frame channel member 115 by pins 90. Weights 92 urge the fingers downwardly. Located along both edges of the machine are adjustable side walls 91 and 92 against which the ends of separator blank 10 abut. The adjustment mechanism for the side walls is best illustrated in FIGS. 15. As shown in FIG. 15, adjustable side wall 92 is adjustable by virtue of arm 93 attached thereto which passes through adjustable screw mechanism 94. Identical arms 95 and screw mechanism 96 are located on the other side of the machine as illustrated in FIG. 3A.

Located to a position downstream from where the battery separator blanks 10 are fed onto the conveyor chains 80 and 81 is a grinding station 100. Grinding station 100 is comprised of a grinding wheel 101 carried by shaft 102 which is powered by suitable power source. A pair of central hold down fingers 103a and 103b further assist in holding the separator blank 10 down. The purpose of grinding wheel 101 is to grind a V-shaped notch through the longitudinal edge ribs 11 of separator 10, as best shown in FIGS. 13, 14, 25, and 26, wherein the V-shaped notch is designated as 104.

The purpose of V-shaped notch 104 is to permit the separator blank to be folded along a transverse line running through the V-shaped notches without buckling of the longitudinal edge ribs, as best shown in FIGS. 28, 29, and 30. However, where the thermoplastic sheet material that is to be formed into an envelope is not a battery separator blank or is not a battery separator blank having ribs, the grinding station 100 may be omitted.

After the grinding station, the battery separator blanks 10 are carried by the conveyor to a heating station 110 which is comprised of an upper line heater 111 and an identical lower line heater 112 (see FIG. 26). Only the upper line heater 111 is illustrated in FIGS. 3A and 4A. The upper and lower line heaters 111 and 112 heat the battery separator blanks 10 along a narrow transverse zone at a location where the separator blank 10 is to be folded, which narrow transverse zone encompasses notches 104 in the longitudinal edge ribs 11 of the separator blanks 10. Any suitable heating means which will heat the battery separator blank along a narrow band or zone along the intended fold line is suitable for employment in the present invention. A suitable type of line heater is an infrared heater manufactured by Research, Inc., of Minneapolis, Minn., Model No. 5193. While it is preferable to have such a heater placed on both sides of the thermoplastic sheet material as it passes through the heating station 110, for some purposes a single line heater located either above or below the sheet may be satisfactory. It should also be noted that heating station 110 may be omitted entirely when the separator blank is formed of a non-rigid material which can be folded without heating. The upper line heater 111 is secured to the machine frame by suitable frame members 113 and 114. A channel member 115 secured to the upper line heater 111 provides means for attaching pivot pins 90 which pivotally secure hold down fingers 88 thereto.

After passing through the heating station 110, the battery separator blanks 10 are transferred from conveyor chains 80 and 81 to a pair of speedup belts 120 and 121 as illustrated in FIGS. 3B, 8, 9, and 12. Forming a nip at the leading edge of speedup belts 120 and 121 are a pair of hold down roller assemblies 122 and 123. Each assembly is identical to assembly 123 which is best illustrated in FIGS. 8 and 9. As illustrated in FIGS. 8 and 9, pairs of pulleys 124a, b and 125a, b support belts 126a, b trained therearound. Pulleys 124a, b are supported on arms 127a, b and pulleys 125a, b are supported on arms 128a, b. Arms a and b pivot about pivot pin 129 and arms 128a, b pivot about pivot pin 130. A spring 131 is securely fastened to the upper portion of arms 127a, b and adjustably fastened to the upper portion of arms 128a, b by means of a screw assembly 132. Spring 131, whose tension may be adjusted by screw assembly 132, keeps tension on pulleys 124a, b and 125a, b in a direction tending to separate them, thereby keeping the belts tight around the pulleys. The lower reach of belt 126a is located just above speedup belt 121 a distance sufficient to cause good contact between the battery separator blank 10 and the speedup belt 121.

Separator blanks 10 are fed forward by speedup belts 120 and 121 until they come into contact with a stop member 133. Stop member 133 is securely fastened to an adjustable stop plate 134 which has a pair of slots 135 and 136 located therein and is fastened to a machine frame by bolts 137 and 138. The stop 133 may thereby be adjusted to provide accurate positioning of the battery separator blank 10 for subsequent operations. Reference is made to FIG. 3B for details of the stop and stop plate assembly.

The battery separator blanks 10 come to rest against stop member 133 over a movable table 140, which is shown in phantom in FIG. 21. Movable table 140 has a pair of slots 141 and 142 therein for receiving the trailing reach of speedup belts 120 and 121, as best shown in FIGS. 3B and 21.

It might be explained that prior to reaching the movable table 140, the upper reach of speedup belts 120 and 121 ride in a depression on the upper surface of the machine frame as shown in FIG. 16.

Movable table 140 pivots about shaft 143 as shown in FIG. 3B. The movable table 140 is pivotable upwards about shaft 143 by the action of an air cylinder 144 and its associated piston rod 145 which is attached to movable table 140 by means of a suitable cleat and associated fastening member 146, as shown in FIG. 7. Air cylinder 144 is mounted on a plate 147 which is adjustable relative to the machine frame by viture of slots 148 and 149 located therein and mounting bolts 150 and 151. The air cylinder 144 is connected to a suitable source of air under pressure by flexible conduits 152 and 153. The actuation of the air cylinder will be explained below.

Located between movable table 140 and the sealing station 170 is a generally elliptically configured curved surface 160. As shown in FIGS. 3B, 7 and 21, the curved surface 160 in a preferred embodiment is a rod supported by a support member 161. Curved surface 160 traverses a foreshortened arc of approximately 90° from its first or leading end to its second or trailing end, and is configured to fold a battery separator blank into an envelope when the blank is moved from the movable plate 140 to the sealing station 170 by a method of operation which will be explained below. This action of curved surface 160 is best illustrated in FIGS. 28, 29, and 30.

The sealing station 170, best illustrated in FIGS. 3B and 4B, is comprised of a pair of ultrasonic generators 171 and 172 and associated ultrasonic horns 173 and 174, respectively. Reference is made to copending patent application Ser. No. 431,146, filed Jan. 7, 1974, for more details concerning the ultrasonic horns. These horns and their associated generators are commercially available from Branson Sonic Power Company of Danbury, Conn., Model No. 227. Reference is further made to U.S. Pat. Nos. 3,328,610 and 3,524,085 which are relative to the ultrasonic horn and generator.

The ultrasonic generators 171 and 172 are carried by a suitable frame member 175 and 176, respectively, which are horizontally extending arms 177 and 178, respectively. Vertical posts 179 and 180 extend through an adjustable opening in arms 177 and 178. Thus, the frame members 175 and 176 are adjustable vertically upwardly and downwardly by virtue of a lock nut tightening mechanism 181 and 182 located on arms 177 and 178, respectively. The ultrasonic generator and horn assemblies are movable downward into a sealing or welding relationship with a battery separator carried therebeneath during the sealing cycle by virtue of air cylinder and piston assemblies (not shown) which are explained in more detail in aforementioned copending patent application Ser. No. 431,146 and incorporated herein by reference.

Referring now to FIG. 19, an anvil 183 is located beneath ultrasonic horns 173 and 174 as illustrated. A hold down arm 184 is located between the ultrasonic horns 173 and 174.

The transfer means for moving the battery separator blanks 10 from the movable table 140 to the sealing station 170 will now be described. The transfer mechanism is comprised of four pickup arms 190, 191, 192, and 193 attached to a turntable 194 by suitable fastening means as illustrated in FIGS. 3B, 7, and 24. The pickup arms 190–193 are located 90° apart on the turntable 194. The arms 190–193 have a width such that they will fit between the edge ribs 11 of a blank 10. Reference is made to FIGS. 17 and 18 for cross sectional details of a typical pickup arm 193. Located on the interior of pickup arm 193, as well as the other pickup arms, are a plurality of channels 195. A series of holes or openings 196 extend to the outside of the bottom of the pickup arm and communicate the channels 195 with the exterior of the pickup arm. Channels 195 communicate with a pickup arm manifolds 197 a, b, c, d, and manifolds 197 a, b, c, d communicate with a hose members 198 a, b, c, d as best illustrated in FIG. 3B. As shown in FIG. 20, the hoses 198 a, b, c, d are communicated with a central manifold 199 via nipple member 200. Central manifold 199 is connected to a suitable vacuum source (not shown) by means of flexible hose 201, as illustrated in FIG. 5.

The indexing mechanism, generally indicated as reference numeral 210, actuates the turntable 194 and will now be described with particular reference to FIGS. 5 and 6. The indexing mechanism 210 has an indexing table 211 to which turntable 194 is attached by fastening member 212. A hub 213 surrounds central manifold 199 in slildable engagement, and is secured to the indexing table 211 by means of dowel pin 214. An indexing ring 215 is fixedly attached to hub 213 by a plurality of bolts 216 a, b, c, d. An indexing shuttle 217 is held in slidable engagement beneath indexing ring 215 by means of a retainer ring 218. A drive arm 219 is pivotably attached to the indexing shuttle 217 by pivot pin 220. The opposite end of the drive arm 219 is pivotably attached to a cam 221 by a pivot pin 222. Cam 221 is attached to a helical gear 223 by suitable fastening members 224 a, b. Helical gear 223 rotates about axle 225, and is powered thereabout by a driven worm gear 226. The outer end of worm gear 226 is attached to a sprocket 227 which is powered in a manner which will be explained below with particular reference to FIG. 12.

A lock arm 230 is attached to the machine via a pivot pin 231. One end of lock arm 230 is attached to a cam follower 232 by means of pin 233. The other end of lock arm 230 has a finger member 234 extending therefrom as best illustrated in FIG. 6. Finger member 234 is shaped to be received by four slots 235 a, b, c, d located in the periphery of indexing ring 215. Slots 235 are located 90° apart on the indexing ring 215.

Located within indexing shuttle 217 at location 90° apart are channels 236 carrying plungers 237 which are urged outwardly by a spring members 238. Only one channel, plunger and spring member are illustrated in the cutaway portion of FIG. 6.

Located on the underside of turntable 194 and at the periphery thereof are four indexing projections 240. Located in a position on the machine frame beneath turntable 194 in a position to be actuated by indexing projections 240 is a switch 241, best illustrated in FIG. 7. The operation of switch 241 will be explained below.

Located 90° past the heat sealing station 170 is an off-feeding station 250. Reference is made to FIGS. 4B, 7, 8, and 32 for an understanding of the off-feeding station's mechanism and functions. Referring first to FIG. 7, the off-feeding station 250 is comprised of a driven roller 251 and an idler roller 252. Powered roller 251 is driven by a suitable motor means and associated gear box 253 having a sprocket 254 which powers roller 251 via a chain 255 trained around sprocket 256 attached to roller 251.

Idler roller 252 has its axle 257 attached to a movable frame member 258 which is pivotably attached to the machine frame via pivot pin 259. An air cylinder 260, which is attached to the machine frame by suitable means 261, has its piston rod 262 attached to a lug 263 attached to movable frame member 258. Air hoses 264 and 265 are attached to air cylinder 260 to actuate the cylinder in a manner to be described. When the piston rod 262 is extended, movable frame member 258 moves upwardly, and causes a battery separator envelope carried by the pickup arm to be brought into contact with driven roller 251 whereby the envelope is removed from the pickup arm as best illustrated in FIG. 32. Upon removal from the pickup arm, the battery separator envelope formed from black 10 drops down chute 266 into a suitable receiving means.

A description of the driven means for powering the apparatus of the present invention will now be presented with particular reference to FIG. 12. The conveying system and indexing system are all powered by a single power source 270. Power source 270 having an associated gear box drives two main drive sprockets 271 and 272. Drive sprocket 271 rotates sprocket 273 by the action of drive chain 274 which is trained around drive sprocket 271 and sprocket 273. Sprocket 273 is in turn fastened to an axle 275 at one end thereof, the other end of which is attached to sprocket 276. A drive chain 277 is trained around sprocket 276 at its upper reach.

As discussed previously, sprocket 227 drives worm gear 226 which actuates the indexing mechanism 210.

Drive sprocket 272 rotates sprocket 280 via a drive chain 281. Sprocket 280 is located at one end of an axle 282, which carries a further sprocket 283 at its other end. Sprocket 283 drives sprocket 284 by virtue of chain 285 trained thereabout as illustrated. Sprocket 284 is connected to sprockets 286 and 287 by virtue of an axle 288. Sprockets 286 and 287 power conveyor chains 80 and 81, respectively, as shown in FIG. 12.

Chain 285 is also trained around sprocket 290 which drives speedup belts 120 and 121 by virtue of its connection to sprocket 291 carried on common axle 292, and chain 293 trained around sprocket 294 which is located on an axle 295 which, at its outer ends, carry pulleys 298 and 297 around which are trained the speedup belts 120 and 121, respectively.

The operation of the apparatus of the present invention will now be described.

Referring first to FIGS. 3A, 4A, and 11, hopper 20 is loaded with a stack of battery separator blanks 10 and the weight 50 placed in back thereof. The action of belts 37 and 38 forming the hopper bottom moving in the direction shown by the arrows in FIG. 3A urge the separator blanks toward end walls 29 and 30. By virtue of the extension of end walls 29 and 30 inwardly of side walls 21 and 22 of the hopper 20, the separator blanks are retained therein. As conveyor chains 80 and 81 move around their respective rear sprocket wheels 84 and 85, the positioning pegs 83 located on chain 81 comes into contact initially with switch arm 85, thereby activating switch 73. Upon activation of switch 73, air cylinder 72 is actuated to extend its piston rod 71 which moves suction arms 62 and 63 about fixed shaft 67, thereby urging suction head 61 inwardly toward the rear of hopper 20. At its innermost reach the raised land portion 64 of suction head 61 comes into contact with the rearmost separator blank 10, as best illustrated in FIG. 11. The suction source (not illustrated) to which hose 56 is attached creates a constant suction force through opening 65 is raised land 64, thereby causing the rearmost separator blank 10 to become attached to the raised land 64 of suction head 61. As the same positioning peg 83 that actuated switch arm 75 goes on around sprocket wheel 85, it next comes into contact with switch arm 76 thereby actuating switch 74. Upon actuation of switch 74, air cylinder 72 is actuated to retract piston rod 71, thereby causing suction head 61 to move away from hopper 20 as shown in the phantom in FIG. 11. The suction is sufficiently strong that one separator blank 10 is withdrawn from the hopper and held by suction head 61 until the blank comes into contact with curved tracks 51 and 52 and horizontal stop member 57. As the suction head 61 continues to move outwardly, the action of the curved tracks 51 and 52 as well as horizontal stop member 57 upon the separator blank 10 causes it to resist further travel with the suction head 61, thereby breaking the suction. The removed separator blank 10 then slides down curved tracks 51 and 52 and onto conveyor chains 80 and 81. By virtue of the timing of the removal of the battery separator blank 10 and the various hold down finger 87 and 88, the separator blank is positioned securely with its trailing longitudinal edge against positioning pegs 82 and 83.

As the separator blank travels into grinding station 100, additional hold down fingers 103a and 103b hold down the central transverse portion of the separator blank, and grinding wheel 101 grinds a V-shaped notch in the longitudinal edge ribs 11. This grinding action is illustrated best in FIGS. 13, 14, and 25.

The battery separator blank next is carried by conveyor chains 80 and 81 through the heating station 110. As it passes through heating station 110, the separator blank is heated along a narrow transverse zone in its midportion by a pair of line heaters 111 and 112, as illustrated schematically in FIG. 26. The action of the line heaters upon the separator blank soften the midportion thereof to permit the thermoplastic material forming the separator blank to be folded.

As the conveyor chains 80 and 81 reach their outer reach, at the point where they are trained around sprocket 286 and 287, the separator blank is passed into the nip formed between hold down roller assemblies 122 and 123 and speedup belts 120 and 121, respectively. Speedup belts 120 and 121 are moved at a faster speed than conveyor chains 80 and 81, and the separator blank is quickly moved forward until its leading longitudinal edge comes into contact with stop member 133. In this position, the separator blank 10 rests on a movable table 140. Air cylinder 144 which is connected by its piston rod 145 is movable table 140, is then actuated to extend piston rod 145 outwardly and thus raise table 140 upwardly around pivot shaft 143. Air cylinder 144 is actuated by virtue of the actuation of switch 241 by indexing projections 240 depending from the bottom of turn table 194, as illustrated in FIG. 7. The raising of table 140 carrying a battery separator blank 10 thereon brings the upper surface of approximately one-half of the separator blank into contact with the lower surface of a pickup arm 190. By virtue of suction acting through holes 196 in the lower surface of pickup arm 190, approximately one-half of the separator blank is held securely to the bottom thereof, the other half extending outwardly beyond the pickup arm, as illustrated. A suitable timer switch and associated valve means (not illustrated) are then actuated to retract piston rod 145 and movable table 140.

The indexing mechanism 210 is then actuated to move pickup arm 190 through an arc of 90°. During movement of the pickup arm 190 through this arc, the outer half of separator blank 10, which extends beyond the end of pickup arm 190, is brought into contact with curved surface 160. The curved surface is of such a configuration that it pushes against the bottom of the extended portion of separator blank 10 to fold it along the previously heated zone in the midportion thereof as best illustrated in the series of diagramatic drawings in FIGS. 28, 29, and 30. Basically, this configuration is an elliptical arc extending from a first or leading end or terminus adjacent movable table 140 to a second or trailing end or terminus adjacent sealing station 170, the radius from the center of central manifold 199 to said first end being greater than the radius from the center of control manifold 199 to said second end. At said first end, the curved surface or rod 160 is of such height that the underside of a separator blank carried by a pickup arm (e.g., 190) is in contact with the upper surface thereof. The curved surface of rod 160 then rises to a maximum height approximately mid-way through its traverse, which would be approximately the position where the blank 10 is folded approximately 90°. The curved surface or rod 160 then decreases in height, and its arc becomes foreshortened, for the remainder of its traverse, thereby completing the folding action. Reference is made to FIG. 22 which shows a portion of the folding action as the separator blank is in approximately the midportion of its travel from movable table 140 and heat sealing station 170. By the time the pickup arm 190 and the separator blank 10 carried thereby reach heat sealing station 170, the separator blank has been completely folded about the pickup arm 190 as illustrated in FIG. 30. The indexing mechanism 210 causes the pickup arms to stop for a finite period of time at the end of every 90° movement. Switch 241 is again actuated by an indexing projection 240, which, among other things, causes the heat sealing horns 173 and 174 to descend into heat sealing position over the longitudinal edge ribs 11 which are now in justaposed position as shown in FIG. 23. The horns are actuated to weld the adjacent longitudinal edge ribs together to thereby form a completed envelope.

The indexing mechanism 210 next moves the pickup arm and the welded separator envelope carried thereon through another arc of 90° to the off-feeding station 250.

Air cylinder 260, as shown best in FIG. 7, is actuated by virtue of indexing projection 240 acting upon switch 241 to extend its piston rod 262 and thereby move roller 252 upwardly into contact with the pickup arm 192 and upwardly into contact with moving roller 251. The action of moving roller 251 and idler roller 252 acting upon the separator envelope carried by pickup arm 192 is such as to remove it from the pickup arm 192 and eject it down chute 266. This action is illustrated schematically in FIG. 32.

Figure 6:
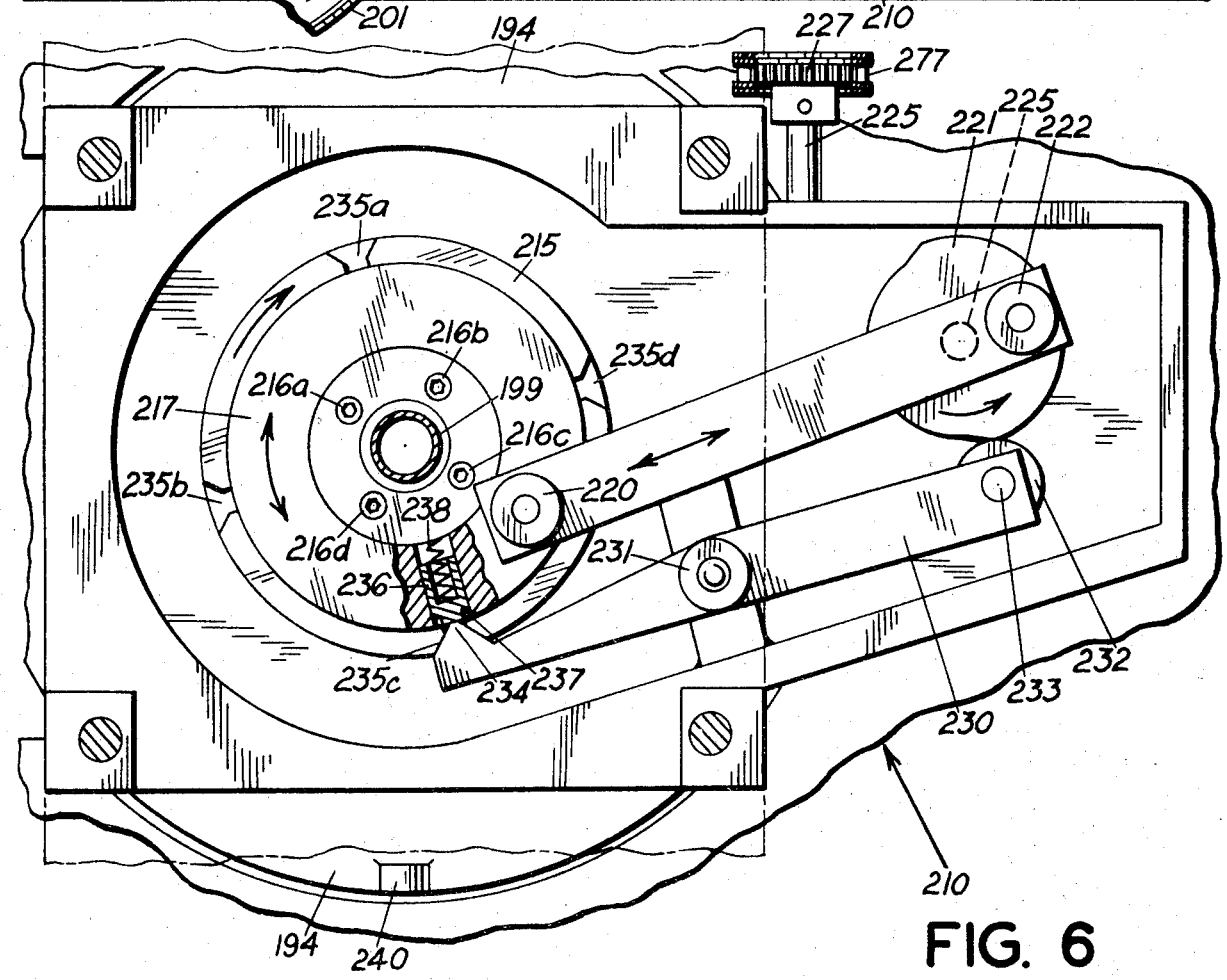
FIG. 6 is a bottom plan view of the indexing mechanism taken along line 6—6 of FIG. 5.

Reference is now made to FIGS. 5 and 6 for an explanation of the indexing mechanism 210. The indexing mechanism is a standard item of commerce sold by Jackson Machine as Jackson Index Table, Model No. T-14-4006W.

Cam 221 is constantly driven in the direction shown by the arrow in FIG. 6 by the action of worm gear 226 acting upon helical gear 223. Drive arm 219 attached to cam 221 reciprocates indexing shuttle 217 back and forth through an arc of about 90°. The action of cam 221 upon cam follower 232 of lock arm 230 in the position shown in FIG. 6 causes finger 234 to be held in slot 235 which prevents indexing ring 215 from moving. As soon as cam 221 moves in the direction shown and for the next 180° change of position from that illustrated in FIG. 6, the pressure on cam follower 232 is released, since it is now in contact with the reduced radius portion of cam 221, and plunger 237 then forces index finger 234 out of slot 235, thereby permitting indexing ring 215 to rotate in the direction shown by the arrow with the indexing shuttle 217 by virtue of a frictional engagement therebetween. The rotation of indexing ring 215 causes hub 213 to rotate which in turn rotates indexing table 211 and turn table 194 attached thereto. By the time slot 235d has rotated into position adjacent indexing finger 234, the cam 211 has changed position by 180° from that shown in FIG. 6 and, by virtue of the action of the expanded radius portion thereof upon cam follower 232, indexing finger 234 is forced into slot 235d which again prevents motion of indexing ring 215. The period of time during which indexing ring 215 is held stationary is determined by the speed of worm gear 226, the ratios of gears 226 and 223, and the size of cam 221.

While the indexing mechanism has been described with reference to work stations located 90° apart, only three of these work stations located at the position of pickup arms 190–192 in the drawings are employed where envelopes alone are manufactured. However, the present invention also contemplates that the battery separator envelopes may be formed around a battery plate so that the plate does not have to be inserted into an already formed envelope as a separate process. Thus, at the work station located at the position of pickup arm 193 in the drawings, and with particular reference to FIG. 21, there may be located a plate feeder means 300 located such as to feed individual plates to the top of a pickup arm located in the position of arm 193. The top of the pickup arm 190–193 may be formed with a recess therein to receive plates fed thereto by feeder means 300. Such feeder means are known in the art and commercially available. One such suitable feeder means is known as the "Reed Stacker." Thus, plates fed by feeder means 300 onto the pickup arms 190–193 would have an envelope formed thereabout during operation of the device of the present invention at the other work stations, and would be ready for insertion into a battery.

Again referring to the indexing finger 210, the central manifold 199 has an upper opening 242 which extends around the periphery thereof slightly more than 90°, as best illustrated by referring to FIGS. 5 and 20. This opening 242 in manifold 199 exposes arms 190 and 191 to the action of the suction applied via hose 201 while in the positions shown in FIG. 20, but cuts off the action of the suction during approximately 270° of the traverse of the pickup arms, between the heat sealing station 170 and the position of movable table 140. Suction is not needed during traverse of the arm from the heat sealing station to the off-feeding station since the sealed envelope is snugly carried by the arm (hand-in-glove fashion).

The method and apparatus of the present invention as just described is thus capable of forming envelopes of thermoplastic sheet material which are open at one end, closed at the other end along a fold, and sealed along the side edges. A plurality of such envelopes, when formed of battery separator blanks of sintered polyvinyl chloride are useful in receiving battery plates for subsequent assembly into a completed battery.

We claim:

1. An apparatus for forming envelopes of thermoplastic sheets comprising;
    a. conveyor means for conveying said sheets individually along a path from a loading station to a transfer station;
    b. feeding means for supplying individual sheets to said conveyor means at said loading station;
    c. sealing means;
    d. an elliptically-shaped curved rod extending from said transfer station to said sealing means;
    e. transfer means comprising;
        1. a turntable,
        2. a plurality of relatively flat pickup arms having an upper and lower surface lying in a horizontal plane attached to said turntable, said pickup arms having a plurality of openings on the lower surface thereof communicating the outside of said arm with a vacuum source, and
        3. means for moving said turntable about its axis in a horizontal plane at predetermined intervals for a predetermined distance, said transfer means being located relative to said transfer station, sealing means and curved rod such that when one of said pickup arms is adjacent a sheet at said transfer station, another of said pickup arms is at said sealing means, and during traverse of one of said pickup arms from said transfer station to said sealing station, a sheet carried thereby is moved against said curved rod whereby it is folded into an envelope about said arm and presented in sealing relationship to said sealing means.

2. The apparatus of claim 1 additionally including feeder means for feeding battery plates to the upper surface of said pickup arms at a location ahead of said transfer station whereby said envelope is formed around said plate.

3. The apparatus of claim 2 additionally including off-feeding means for removing said envelope and plate from said arms at a location past said sealing station.

4. The apparatus of claim 3 wherein said feeder means, transfer station, sealing station and off-feeding means are located approximately 90° apart.

* * * * *